(12) United States Patent
Yun et al.

(10) Patent No.: US 8,839,440 B2
(45) Date of Patent: Sep. 16, 2014

(54) APPARATUS AND METHOD FOR FORECASTING SECURITY THREAT LEVEL OF NETWORK

(75) Inventors: JooBeom Yun, Daejeon (KR); Seung-Hyun Paek, Daejeon (KR); InSung Park, Daejeon (KR); Eun Young Lee, Daejeon (KR); Ki Wook Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1561 days.

(21) Appl. No.: 12/103,069

(22) Filed: Apr. 15, 2008

(65) Prior Publication Data

US 2009/0126023 A1    May 14, 2009

(30) Foreign Application Priority Data

Nov. 12, 2007    (KR) ......................... 10-2007-0115084

(51) Int. Cl.
*G06F 21/00*    (2013.01)
(52) U.S. Cl.
USPC ............... 726/25; 726/13; 726/22; 726/24; 713/187; 713/188; 713/164; 713/165
(58) Field of Classification Search
USPC .......................................... 713/189; 380/201
See application file for complete search history.

(56) References Cited

U.S. PATENT DOCUMENTS

| 5,987,442 | A  | * | 11/1999 | Lewis et al. ................. 706/10 |
| 7,376,090 | B2 | * | 5/2008  | Horng et al. ................ 370/255 |
| 7,624,447 | B1 | * | 11/2009 | Horowitz et al. ............ 726/23 |
| 7,685,271 | B1 | * | 3/2010  | Schneider et al. ........... 709/224 |
| 2004/0250124 | A1 | * | 12/2004 | Chesla et al. ................ 713/201 |
| 2005/0039086 | A1 | * | 2/2005  | Krishnamurthy et al. ...... 714/57 |
| 2005/0193430 | A1 | * | 9/2005  | Cohen et al. .................. 726/25 |
| 2005/0234920 | A1 | * | 10/2005 | Rhodes ........................... 707/10 |
| 2007/0107059 | A1 | * | 5/2007  | Chasin et al. .................. 726/23 |
| 2007/0118899 | A1 | * | 5/2007  | Sridhar et al. ................. 726/22 |

FOREIGN PATENT DOCUMENTS

| JP | 2006-238043 A | 9/2006 |
| KR | 100625096 | 9/2006 |

OTHER PUBLICATIONS http://csrc.nist.gov/nissc/1998/proceedings/paperD5.pdf "A Forecasting Model for Internet Security Attacks"—1998 VCU.*
http://www.sis.pitt.edu/~dtipper/3350/Paper3.pdf "Metrics for Mitigating Cyber-Security Threats to Networks"—IEEE, Nov. 2006.*

(Continued)

*Primary Examiner* — Randy Scott
(74) *Attorney, Agent, or Firm* — Ladas & Parry LLP

(57) ABSTRACT

Provided are an apparatus and method for forecasting the security threat level of a network. The apparatus includes: a security data collection unit for collecting traffic data and intrusion detection data transmitted from an external network to a managed network; a malicious code data collection unit for collecting malicious code data transmitted from a security enterprise network; a time series data transformation unit for transforming the data collected by the security data collection unit into time series data; a network traffic analysis unit for analyzing traffic distribution of the managed network using the data collected by the security data collection unit; and a security forecast engine for forecasting security data of the managed network using the time series data obtained by the time data transformation unit, the data analyzed by the network traffic analysis unit, and the data collected by the malicious code data collection unit.

9 Claims, 6 Drawing Sheets

(56) References Cited

OTHER PUBLICATIONS

Alexander D. Korzyk, Sr., et al; "A Forecasting Model for Internet Security Attacks", National Information System Security Conference, 1998-csrc.nist.gov.

Sangjoon Jung et al.; "Design a Realtime Network Traffic Prediction System based on Time series Analysis", Proceedings of the Korea Information Processing Society Conference, Oct. 2001, pp. 1323-1326, vol. 8, No. 2.

* cited by examiner

APPARATUS AND METHOD FOR FORECASTING SECURITY THREAT LEVEL OF NETWORK

CROSS-REFERENCE TO RELATED APPLICATION

This application claims priority to and the benefit of Korean Patent Application No. 2007-115084, filed Nov. 12, 2007, the disclosure of which is incorporated herein by reference in its entirety.

BACKGROUND

1. Field of the Invention

The present invention relates to an apparatus and method for forecasting the security threat level of a network and, more particularly, to an apparatus and method for forecasting the security threat level of a network, wherein traffic data of a managed network and data on external malicious codes are collected and the security threat level of the managed network is forecast based on the collected data just like a weather forecast.

2. Discussion of Related Art

In recent years, with rapid growth of information and communication technologies (e.g., the Internet), cyber threats, such as Computer Hacking, viruses, worms and Trojan horse, have increased. There are techniques against cyber threats, for example, an intrusion detection system (IDS), an intrusion prevention system (IPS), a network control system, and an enterprise security management (ESM), but these defenses are only to detect the present attacks or provide data on the present state of a network. Since the data on the present state of the network is already old data, it is difficult for a manager or a user to prevent an incident in advance or effectively cope with the incident. Also, data on cyber threats contains only forecast situations, just like a special weather report, instead of that which computer users are actually anxious to know, such as a network speed or an attack threat level of a network.

Therefore, it is necessary to forecast data on the security threat levels of malicious codes (worms and viruses), a network speed (or network traffic), the origins of intrusion errors, the frequency of intrusion detection events, and the probability of network attacks to computer and network users, so that the users can provide against cyber attacks and take proper measures. However, although there are techniques, such as an IDS, an IPS, a network control system, an ESM, and a cyber-attack early warning system, a technique of forecasting cyber attacks has not yet been developed.

SUMMARY OF THE INVENTION

The present invention is directed to an apparatus and method for forecasting the security threat level of a network, which forecast the probability of occurrence of cyber attacks at a network point and provide a user with forecast data so that the user can provide against the cyber attacks.

One aspect of the present invention provides a network security threat level forecast apparatus. The apparatus includes: a security data collection unit for collecting traffic data and intrusion detection data transmitted from an external network to a managed network; a malicious code data collection unit for collecting malicious code data transmitted from a security enterprise network; a time series data transformation unit for transforming the data collected by the security data collection unit into time series data; a network traffic analysis unit for analyzing traffic distribution of the managed network using the data collected by the security data collection unit; and a security forecast engine for forecasting security data of the managed network using the time series data obtained by the time data transformation unit, the data analyzed by the network traffic analysis unit, and the data collected by the malicious code data collection unit.

The security forecast engine may include: a malicious code threat level forecast portion for forecasting the threat level that a malicious code is generated in the managed network; a network attack probability forecast portion for forecasting the probability of attacks on the managed network; a network traffic forecast portion for forecasting the traffic amount and transmission rate of the managed network; an intrusion attempt origin forecast portion for forecasting an origin having a high probability of future intrusion into the managed network; and an intrusion detection frequency forecast portion for forecasting the frequency of intrusions into the managed network. Also, the security forecast engine may use one of a time series prediction model and a Markov chain prediction model. The apparatus may further include a display unit for displaying a forecast result output by the security forecast engine.

The apparatus may further include a database (DB) for storing the forecast result output by security forecast engine, a transformation result output by time series data transformation unit, an analysis result output by network traffic analysis unit, a collection result output by malicious code data collection unit, and a collection result output by security data collection unit.

Another aspect of the present invention provides a method of forecasting the security threat level of a network. The method includes the steps of: collecting traffic data and intrusion detection data transmitted from an external network to a managed network, and collecting malicious code data transmitted from a security enterprise network; transforming the received traffic data into time series data, and comprehending traffic distribution of the managed network using the traffic data; determining the type of a model for analyzing the time series data and data on the traffic distribution of the managed network according to a predetermined data analysis model; performing a time series prediction algorithm or a Markov chain prediction algorithm according to the determined analysis model; and forecasting the probability of attacks on security vulnerable points of the managed network by analyzing a result obtained by performing the time series prediction algorithm or the Markov chain prediction algorithm.

The malicious code data may be collected using a web robot.

The step of performing the time series prediction algorithm may include the steps of: receiving the time series data; generating a time series prediction model corresponding to the received time series data; analyzing and forecasting the security threat level of the network using the generated time series prediction model; analyzing an en-or between an analyzed forecast result and actual data; and applying the time series prediction model to the actual data using the time series data when the error is within a permitted error limit.

The step of performing the Markov chain prediction algorithm may include the steps of: defining a state of received time series data; obtaining a transition probability corresponding to the defined state; obtaining a transition matrix corresponding to the transition probability; forecasting a future state corresponding to the obtained transition matrix and a latest state; and obtaining a significant value by analyzing the forecast future state.

The time series prediction model may be one of an ARIMA model and a Holt-Winter's model. Also, forecasting the probability of the attacks on the security vulnerable points of the managed network may include forecasting one of the level of a threat made by a malicious code against the managed network, the traffic amount and transmission rate of the managed network, an origin having a high probability of intrusions into the managed network, and the frequency of the intrusions into the managed network.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EMBODIMENTS

An apparatus and method for forecasting the security threat level of a network according to the present invention will be described more fully hereinafter with reference to the accompanying drawings, in which exemplary embodiments of the invention are shown.

Figure 1:
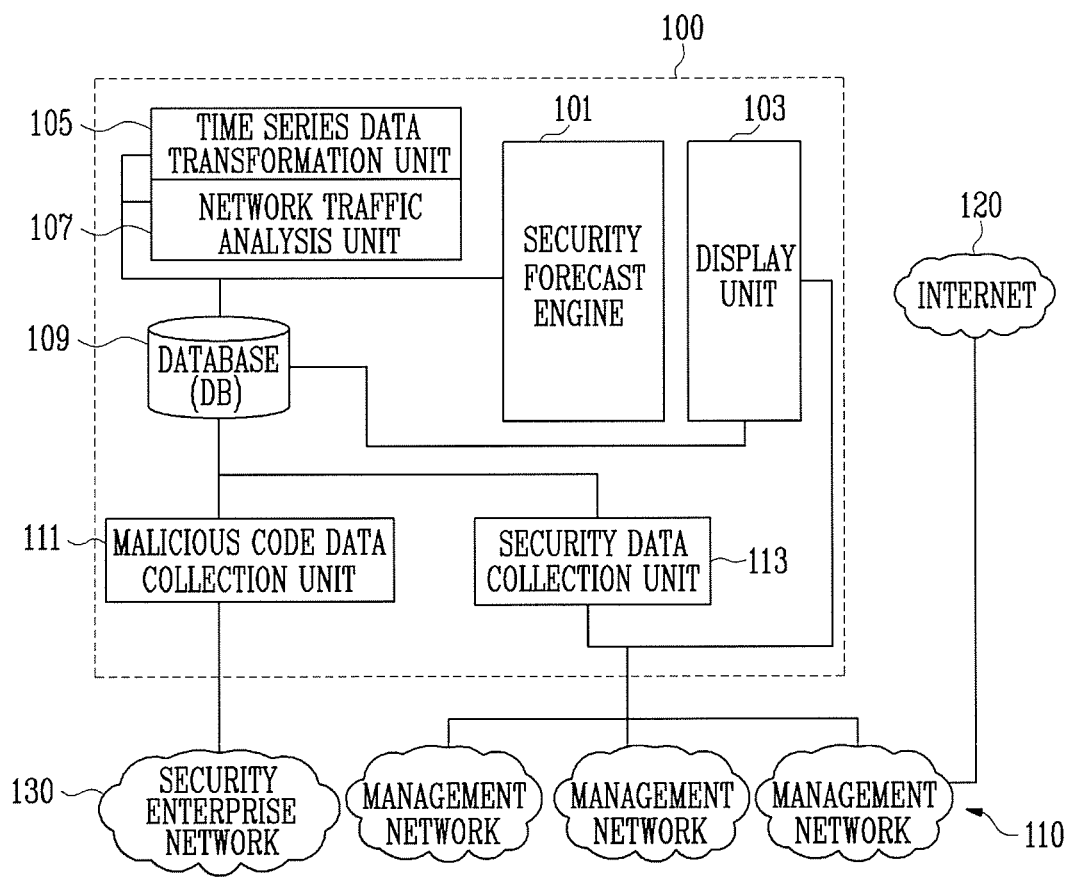
FIG. 1 is a view showing the construction of a network security threat level forecast apparatus according to an exemplary embodiment of the present invention.

FIG. 1 is a view showing the construction of a network security threat level forecast apparatus according to an exemplary embodiment of the present invention.

Referring to FIG. 1, a network security threat level forecast apparatus 100 according to the present invention includes a security forecast engine 101, a display unit 103, a time series data transformation unit 105, a network traffic analysis unit 107, a database (DB) 109, a malicious code data collection unit 111, and a security data collection unit 113.

The security forecast engine 101, which is an essential portion according to the present invention, forecasts the security threat level or the state of attacks of a managed network 110 using a network traffic analysis value or a time series data transformation value stored in the DB 109. The security forecast engine 101 may employ a time series prediction algorithm or a Markov chain prediction algorithm.

The display unit 103 displays a forecast result output from the security forecast engine 101 at the request of the managed network 110. The display unit 103 displays the forecast result using a graph or a chart so that a user can intuitively recognize prediction of the security threat level of the network 110 in the same way as a weather forecast.

The time series data transformation unit 105 lines up traffic data and intrusion detection data of the managed network 110 stored in the DB 109 in the order of time series and transforms the same. The transformed data is stored in the DB 109 again, and the stored data is reused when the security forecast engine 101 forecasts the security threat level of the managed network 110.

The network traffic analysis unit 107 analyzes the traffic data and intrusion detection data of the managed network 110 stored in the DB 109 and comprehends a change in traffic distribution of an Internet network. The comprehended data also is reused when the security forecast engine 101 forecasts the security threat level of the managed network 110.

The DB 109 stores all results that are extracted, collected, and drawn by respective components of the apparatus 100 according to the present invention.

The malicious data collection unit 111 searches a network 130 of an external security enterprise for a new malicious code or a security vulnerable point and collects data on the new malicious code or the security vulnerable point. Typically, the malicious data collection unit 111 searches a network notice board of the security enterprise for data on the emergence of new viruses or new vulnerable points using a web robot and stores the search result in the DB 109.

The security data collection unit 113 searches for network traffic data and intrusion detection data from main points of the managed network 110 and collects the same data. The security data collection unit 113 collects main security-related data of the managed network 110.

Figure 2:
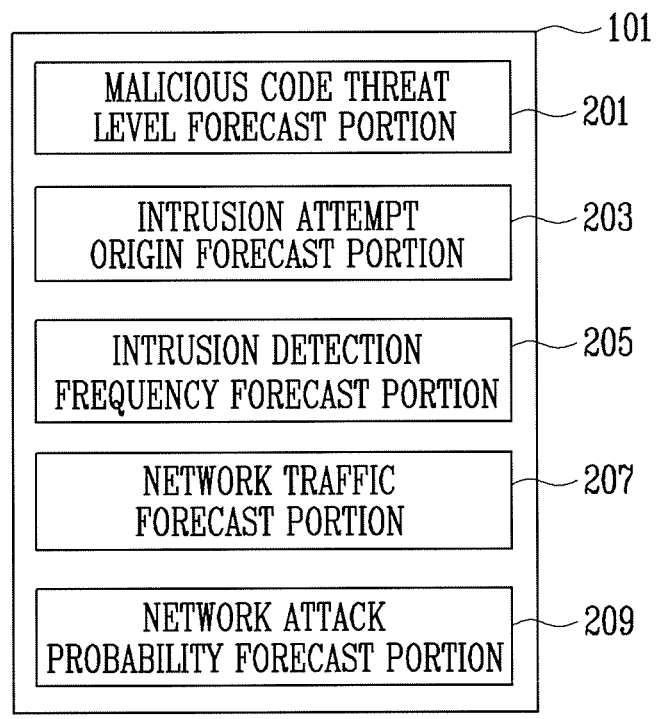
FIG. 2 is a view showing the construction of the security forecast engine shown in FIG. 1.

FIG. 2 is a view showing the construction of the security forecast engine shown in FIG. 1.

Referring to FIG. 2, the security forecast engine 101 includes a malicious code threat level forecast portion 201, an intrusion attempt origin forecast portion 203, an intrusion detection frequency forecast portion 205, a network traffic forecast portion 207, and a network attack probability forecast portion 209.

The malicious code threat level forecast portion 201 forecasts the level of a threat made by a malicious code against a managed network by selecting one of a time series prediction model and a Markov chain prediction model based on collected data on malicious codes. The security threat level of the malicious code may be divided into several sub-levels in consideration of the frequency of occurrence and the threat level of infection with the malicious code.

The intrusion attempt origin forecast portion 203 analyzes Internet protocol (IP) addresses of intrusion origins by national and regional groups based on collected intrusion detection data, and analyzes and forecasts an origin having a high probability of future intrusion into the managed network. In other words, the intrusion attempt origin forecast portion 203 analyzes the frequency of attempts of a specific region or nation to intrude into the managed network based on an IP address and forecasts which region or nation will attempt intruding into the managed network in the future.

The intrusion detection frequency forecast portion 205 selects one of a time series prediction model and a Markov chain prediction model based on the collected intrusion detection data and forecasts the frequency of intrusions using the selected model when attacks against the managed network are predicted.

The network traffic forecast portion 207 selects one of a time series prediction model and a Markov chain prediction model based on the analyzed traffic data of the managed network and forecasts the traffic rate of the managed network using the selected model.

The network attack probability forecast portion 209 selects one of a time series prediction model and a Markov chain prediction model based on the analyzed traffic data of the managed network and forecasts the probability of attacks on security vulnerable points of the managed network. That is, the network attack probability forecast portion 209 obtains a future attack probability based on the frequency of the previous attacks.

By using values predicted by the malicious code threat level forecast portion 201, the intrusion attempt origin forecast portion 203, the intrusion detection frequency forecast portion 205, the network traffic forecast portion 207, and the network attack probability forecast portion 209, the network security threat level forecast apparatus 100 including the security forecast engine 101 can forecast data on the security threat level that a user of the network is actually anxious to know, just like a weather forecast.

Figure 3:
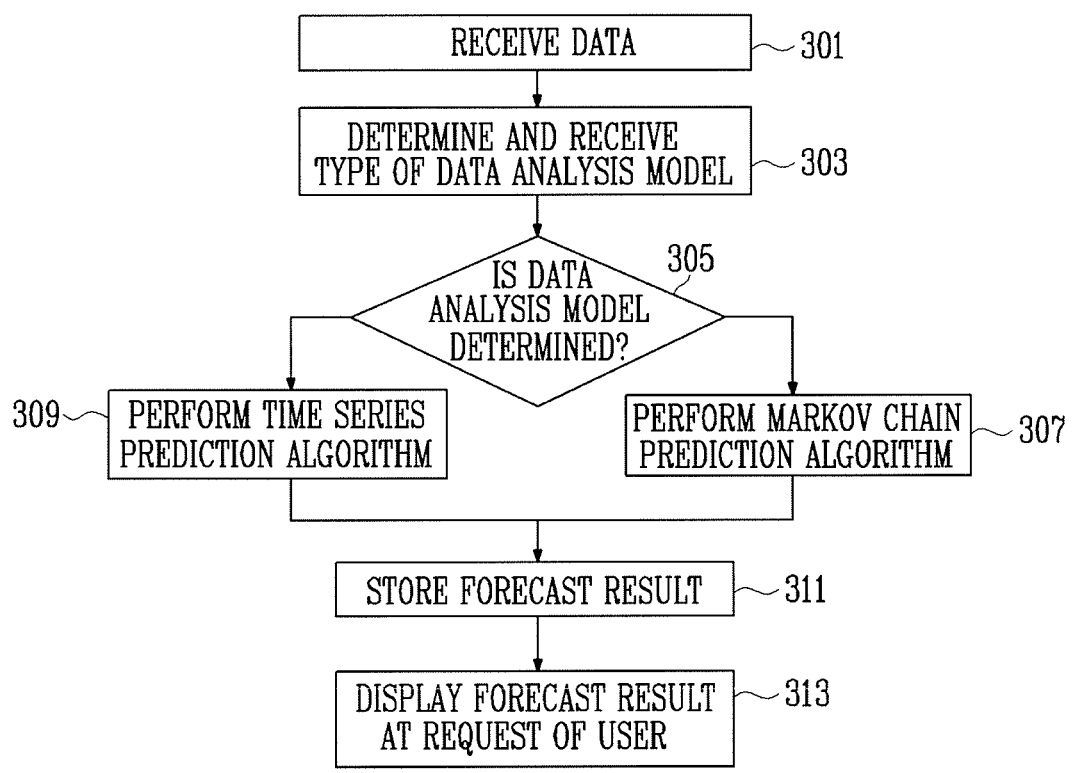
FIG. 3 is a flowchart illustrating a method of forecasting data on a security threat level in a security forecast engine.

FIG. 3 is a flowchart illustrating a method of forecasting data on a security threat level in a security forecast engine.

Referring to FIG. 3, to begin with, required data is received from a DB in step 301. The data includes data stored in a security data collection unit, a malicious code data collection unit, a time series data transformation unit, and a network traffic analysis unit. Thus, required data can be selectively received according to an object to be forecast by the security forecast engine.

In step 303, the type of an analysis model for analyzing the received data is determined and received. As described above with reference to FIG. 2, a variety of forecast portions included in the security forecast engine select one of a time series prediction model and a Markov chain prediction model, so that the type of the selected model is received.

In step 305, it is confirmed if the type of the analysis model is determined. Thereafter, when the time series prediction model is selected, time series prediction algorithm is performed using the time series prediction model in step 309. When the Markov chain prediction model is selected, Markov chain prediction algorithm is performed using the Markov chain prediction model in step 307.

The time series prediction algorithm and the Markov chain prediction algorithm will be described in more detail later with reference to FIGS. 5 and 6.

Thereafter, a forecast result output by selected algorithm is stored in the DB in step 311, and is displayed using a graph or chart at the request of the user of the managed network in step 313.

Figure 4:
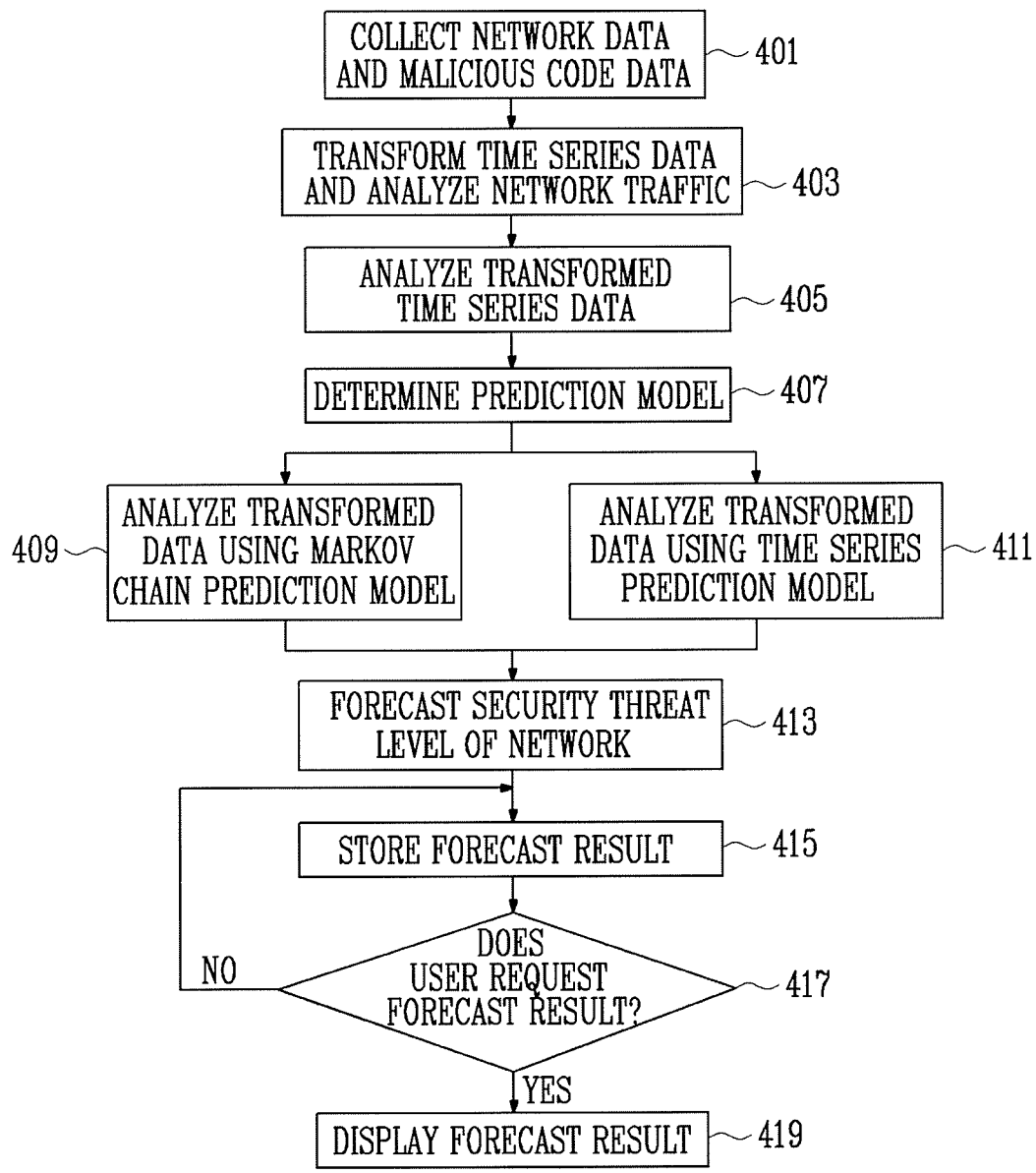
FIG. 4 is a flowchart illustrating a method of forecasting the security threat level of a network according to an exemplary embodiment of the present invention.

FIG. 4 is a flowchart illustrating a method of forecasting the security threat level of a network according to an exemplary embodiment of the present invention.

Referring to FIG. 4, to begin with, data related with a managed network and malicious code data are collected in step 401.

The collected network-related data includes network traffic data searched at main network points and intrusion detection data, and the malicious code data includes data on emergence of new malicious codes searched from a network of an Internet security enterprise.

In step 403, time series data is transformed and network traffic is analyzed based on the searched network-related data and malicious code data. The transformation of the time series data refers to relining-up of the searched network traffic data and intrusion detection data in time order. The analysis of the network traffic refers to the analysis of a change in the network traffic based on the searched network traffic data.

Thereafter, the transformed time series data is analyzed in step 405, and a prediction model appropriate for forecasting the security threat level of the network is determined in step 407. In the current exemplary embodiment of the present invention, a Markov chain prediction model and a time series prediction model may be employed. In order to forecast the security threat level of the network, it is necessary to predict various factors. Therefore, different models appropriate for the various factors may be determined and used to forecast the security threat level of the network.

As a result, the transformed data is analyzed using the Markov chain prediction model as shown in step 409 or using the time series prediction model as shown in step 411.

Thereafter, the security threat level of the network is forecast based on results obtained using the respective models in step 413, and the forecast result is stored in a DB in step 415.

When a user of the managed network requests the forecast result in step 417, the forecast result is extracted from the DB and displayed to allow the user to recognize the prediction of the security threat level of the network in step 419.

Figure 5:
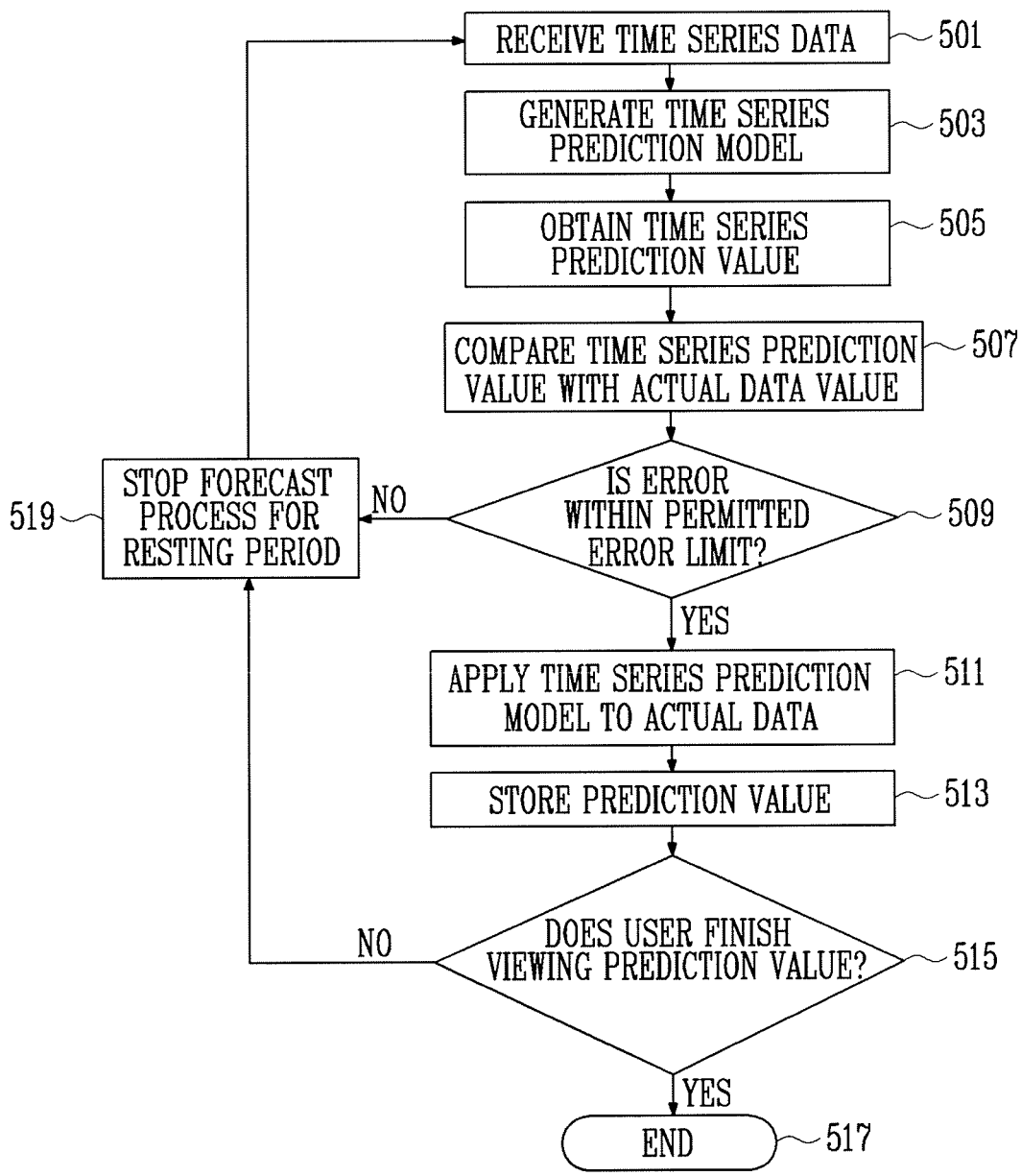
FIG. 5 is a flowchart illustrating a method of forecasting the security threat level of a network using a time series prediction model according to an exemplary embodiment of the present invention.

FIG. 5 is a flowchart illustrating a method of forecasting the security threat level of a network using a time series prediction model according to an exemplary embodiment of the present invention.

Referring to FIG. 5, time series data stored in a DB is received in step 501. The time series data is transformed by a time series data transformation unit and stored. Next, a time series prediction model is generated using time series prediction algorithm based on the received time series data in step 503.

In step 505, a time series prediction value is obtained by substituting a value of the received time series data into the generated time series prediction model. The time series prediction value is compared with an already-given actual data value and a comparison result is analyzed in step 507. In this case, the time series data applied to the prediction model may be, for example, a previous value with the determined result.

Thereafter, when an error between the time series prediction value and the actual data value is within a permitted error limit in step 509, the time series prediction model is applied to actual data in step 511. Thus, a prediction value is output from the prediction model to which the actual data is applied and stored in the DB in step 513. When a user finishes taking a view of the prediction value in step 515, the process is finished in step 517. Meanwhile, when the error between the time series prediction value and the actual data value is not within the allowed error limit or when the user does not finish the process, the forecast process is not performed for a predetermined resting period and returns to step 501 in step 519.

Figure 6:
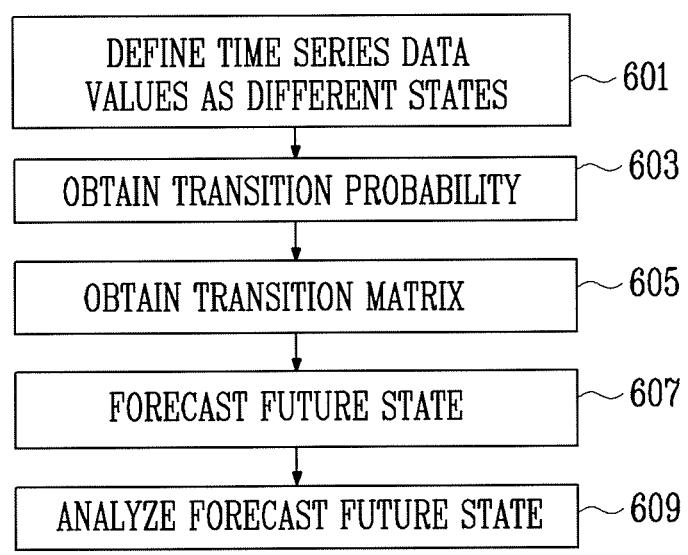
FIG. 6 is a flowchart illustrating a method of forecasting the security threat level of a network using a Markov chain prediction model according to an exemplary embodiment of the present invention.

FIG. 6 is a flowchart illustrating a method of forecasting the security threat level of a network using a Markov chain prediction model according to an exemplary embodiment of the present invention.

Referring to FIG. 6, time series data values are divided into appropriate periods and defined as different states, and time series data received from a DB is transformed into one of the states in step 601. For example, assuming that the time series data values range from 1 to 100, the data values of 1 to 33 are defined as a first state, the data values of 34 to 66 are defined as a second state, and the data values of 67 to 100 are defined as a third state.

Thereafter, a transition probability is obtained using the resultant state data in step 603, and a transition matrix is obtained using the transition probability in step 605.

In step 607, a future state is forecast using the obtained transition matrix and the latest state. Thereafter, the forecast future state is analyzed to obtain a significant value in step 609. For instance, when the forecast future state is the third state, the third state corresponds to the data values of 67 to 100, so that the future state may be analyzed as an intermediate value (i.e., 83.5) between 67 and 100.

As described above, the present invention provides an apparatus and method for forecasting the security threat level of a network, which can forecast the probability of occurrence of network attacks at a network point and provide a user with data so that the user can provide for the network attacks.

In the drawings and specification, there have been disclosed typical preferred embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. An apparatus for forecasting the security threat level of a network, comprising:
- a non-transitory computer-readable storage medium having executable computer program logic embodied therein compromising:
- a processor configured to execute the computer program logic;
- a security data collection unit for collecting traffic data and intrusion detection data transmitted from an external network to a managed network;
- a malicious code data collection unit for collecting malicious code data transmitted from a security enterprise network, wherein the security enterprise network is distinct from the managed network;
- a time series data transformation unit for transforming the data collected by the security data collection unit into time series data;
- a network traffic analysis unit for analyzing traffic distribution of the managed network using the data collected by the security data collection unit; and
- a security forecast engine for forecasting security data of the managed network using the time series data obtained by the time data transformation unit, the data analyzed by the network traffic analysis unit, and the data collected by the malicious code data collection unit,
- wherein the security data includes a forecasted threat level that a malicious code is generated in the managed network,
- wherein the forecasted threat level that a malicious code is generated in the managed network is forecasted using the malicious code data transmitted from the security enterprise network.

2. The apparatus according to claim 1, wherein the security forecast engine comprises:
- a malicious code threat level forecast portion for forecasting the threat level that a malicious code is generated in the managed network;
- a network attack probability forecast portion for forecasting the probability of attacks on the managed network;
- a network traffic forecast portion for forecasting the traffic amount and transmission rate of the managed network;
- an intrusion attempt origin forecast portion for forecasting an origin having a high probability of future intrusion into the managed network; and
- an intrusion detection frequency forecast portion for forecasting the frequency of intrusions into the managed network.

3. The apparatus according to claim 2, wherein the security forecast engine uses one of a time series prediction model and a Markov chain prediction model.

4. The apparatus according to claim 1, further comprising a display unit for displaying a forecast result output by the security forecast engine.

5. The apparatus according to claim 1, further comprising a database (DB) for storing the forecast result output by security forecast engine, a transformation result output by time series data transformation unit, an analysis result output by network traffic analysis unit, a collection result output by malicious code data collection unit, and a collection result output by security data collection unit.

6. A computerized method of forecasting the security threat level of network, comprising:
- a non-transitory computer-readable storage medium having executable computer program logic embodied therein compromising:
- providing a processor configured to execute the computer program logic;
- collecting traffic data and intrusion detection data transmitted from an external network to a managed network, and collecting malicious code data transmitted from a security enterprise network, wherein the security enterprise network is distinct from the managed network;
- transforming the received traffic data and the intrusion detection data into time series data, and comprehending traffic distribution of the managed network using the traffic data; and
- forecasting, by a processor, security data of the managed network by analyzing the time series data, the traffic distribution of the managed network and the malicious code data transmitted based on a time series prediction algorithm or a Markov chain prediction algorithm,
- wherein the security data includes a forested threat level that a malicious code is generated in the managed network,
- wherein the forecasted threat level that a malicious code is generated in the managed network is forecasted using the malicious code data transmitted from the security enterprise network.

7. The method according to claim 6, wherein the malicious code data is collected using a web robot.

8. The method according to claim 6, wherein the time series prediction model is one of an ARIMA model and a Holt-Winter's model.

9. The method according to claim 6, wherein the security data further includes a forecasted probability of attacks on the managed network, a forecasted traffic amount and transmission rate of the managed network, an origin having a high probability of future intrusion into the managed network and a forecasted frequency of intrusion into the managed network.

* * * * *